US008821261B2

(12) United States Patent
Ennis et al.

(10) Patent No.: US 8,821,261 B2
(45) Date of Patent: Sep. 2, 2014

(54) SELECTING A WAGER FOR AN EVENT

(75) Inventors: Patrick John Ennis, Bellevue, WA (US); Alexander Knight, Seattle, WA (US); Vlad Grigore Dabija, Mountain View, CA (US); Timothy Martin Londergan, Seattle, WA (US); David Walter Ash, Bellevue, WA (US); Dominic Dan Suciu, Edmonds, WA (US); Raghuram Madabushi, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/702,907

(22) PCT Filed: Jun. 12, 2012

(86) PCT No.: PCT/US2012/042033
§ 371 (c)(1), (2), (4) Date: Dec. 7, 2012

(87) PCT Pub. No.: WO2013/187880
PCT Pub. Date: Dec. 19, 2013

(65) Prior Publication Data
US 2013/0331176 A1 Dec. 12, 2013

(51) Int. Cl.
*G06F 17/00* (2006.01)
*G07F 17/32* (2006.01)

(52) U.S. Cl.
CPC .......... *G07F 17/323* (2013.01); *G07F 17/3244* (2013.01); *G07F 17/3237* (2013.01); *G07F 17/3288* (2013.01)
USPC .......... 463/25

(58) Field of Classification Search
USPC .......... 463/16–26
See application file for complete search history.

(56) References Cited

U.S. PATENT DOCUMENTS

| | | | |
|---|---|---|---|
| 5,803,810 | A | 9/1998 | Norton et al. |
| 7,587,214 | B2 | 9/2009 | Inselberg |
| 7,865,141 | B2 | 1/2011 | Liao et al. |
| 2006/0288377 | A1 | 12/2006 | Hsieh |
| 2010/0151935 | A1 | 6/2010 | Platis et al. |
| 2011/0319148 | A1 | 12/2011 | Kinnebrew et al. |
| 2012/0028718 | A1 | 2/2012 | Barclay et al. |
| 2012/0123875 | A1 | 5/2012 | Svendsen et al. |

OTHER PUBLICATIONS

International Search Report and Written Opinion for application with application No. PCT/US2012/042033, dated Aug. 31, 2012, 20 pages.

*Primary Examiner* — Ronald Laneau
(74) *Attorney, Agent, or Firm* — Moritt Hock & Hamroff LLP; Steven S. Rubin, Esq.

(57) ABSTRACT

Technologies are generally described for processes and systems effective to select or determine a wager for an event. A wager processor may be configured to be in communication with a wager database and an event status processor over a network. The wager processor may be effective to receive event information and crowd information. The event information may relate to a status of the event. The crowd information may relate to demographics and/or interests of the participants at the event. The wager processor may select or determine the wager based on the event information and the crowd information.

20 Claims, 6 Drawing Sheets

100

SELECTING A WAGER FOR AN EVENT

CROSS REFERENCE TO RELATED APPLICATIONS

This application is a 371 of International Application No. PCT/US12/42033 filed Jun. 12, 2012, the entirety of which is hereby incorporated by reference.

BACKGROUND

Unless otherwise indicated herein, the materials described in this section are not prior art to the claims in this application and are not admitted to be prior art by inclusion in this section.

Two or more participants may attend an event at a location. The event may include a sporting contest, a concert, etc. Participants at the event may collectively form a crowd.

SUMMARY

In an example, a method for selecting a wager for an event is generally described. The method may include, by a processor, receiving event information. The event information may relate to a status of the event. The method may further include receiving crowd information. The crowd information may relate to demographics and/or interests of the participants at a location of the event. The method may further include selecting the wager based on the event information and the crowd information.

In an example, a device effective to select a wager for an event is generally described. The device may include a memory including instructions and a processor in communication with the memory. The processor may be effective to perform the instructions in the memory to receive event information. The event information may relate to a status of the event. The processor may further be effective to receive crowd information. The crowd information may relate to demographics and/or interests of the participants at a location of the event. The processor may further be effective to select the wager based on the event information and the crowd information.

In an example, a system effective to select a wager for an event is generally described. The system may include a wager database, a memory including instructions, an event status processor, and a wager processor configured to be in communication with the wager database, the memory and the event status processor over a network. The wager processor may be effective to perform the instructions in the memory to receive event information. The event information may relate to a status of the event. The wager processor may be effective to receive crowd information. The crowd information may relate to demographics and/or interests of the participants at a location of the event. The wager processor may be effective to select the wager based on the event information and the crowd information.

In an example, a mobile device is generally described. The mobile device may include a screen, a memory including instructions and a processor configured in communication with the memory and the screen. The processor may be effective to send a mobile device message to a wager processor. The mobile device message may indicate whether a particular participant is at a location of the event. The processor may be effective to receive terms relating to a wager in response to the mobile device message. The wager may be based on a status of the event and demographics and/or interests of participants at a location of the event. The processor may be effective to display the terms of the wager on the screen.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
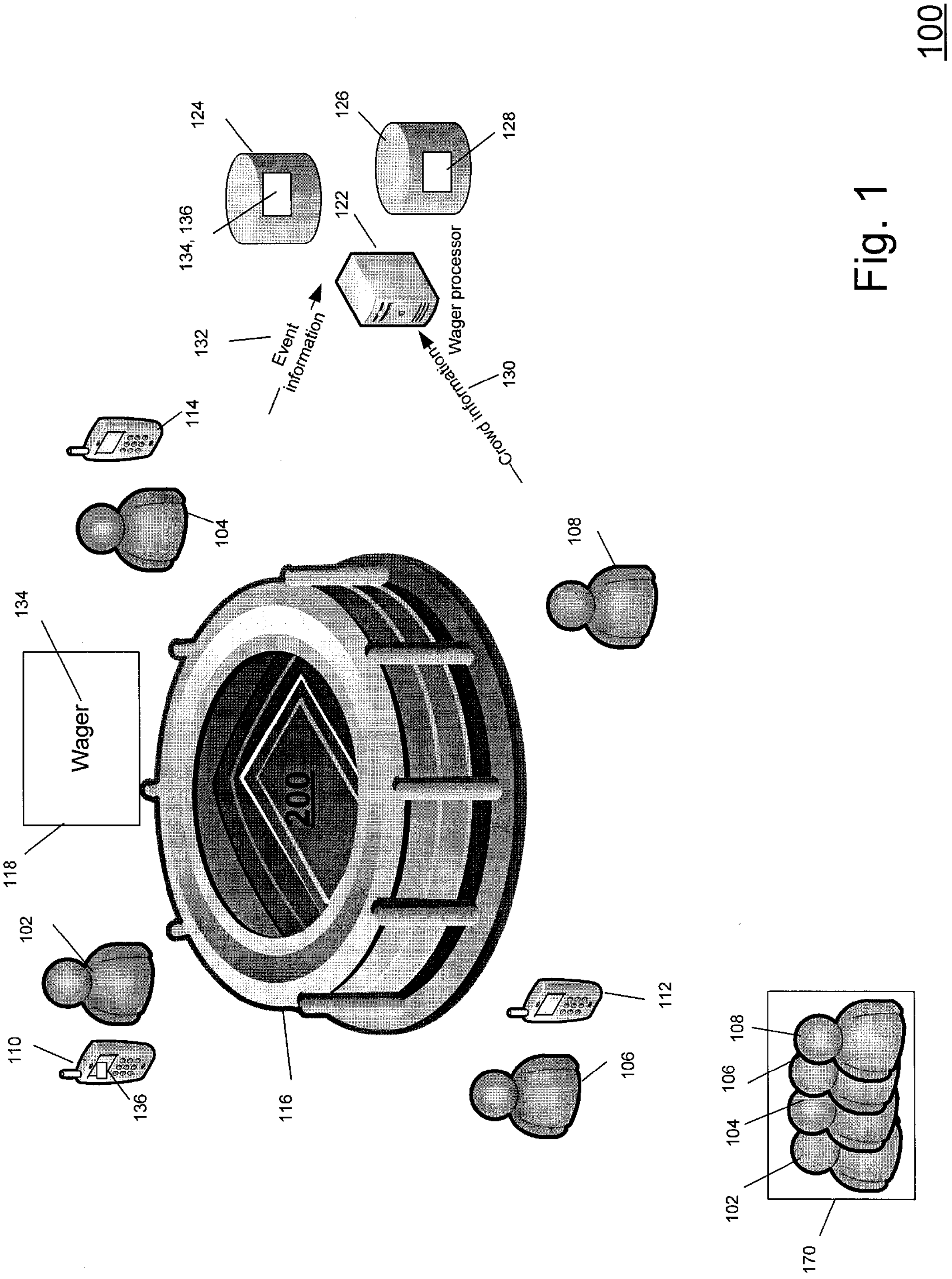
FIG. 1 illustrates some example systems that can be utilized to implement selecting a wager for an event.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to selecting or determining a wager for an event.

Briefly stated, technologies are generally described for processes and systems effective to select or determine a wager for an event. A wager processor may be configured to be in communication with a wager database and an event status processor over a network. The wager processor may be effective to receive event information and crowd information. The event information may relate to a status of the event. The crowd information may relate to demographics and/or interests of the participants at the event. The wager processor may select or determine the wager based on the event information and the crowd information.

FIG. 1 illustrates some example systems that can be utilized to implement selecting a wager for an event in accordance with at least some embodiments described herein. In some examples, as explained in more detail below, a system 100 may include two or more participants 102, 104, 106, 108 that may collectively form a crowd 170 for an event 200 at a location 116. Some participants 102, 104, 106 may be in communication with or otherwise using respective mobile devices 110, 112, 114. A wager processor 122 may receive crowd information 130 relating to participants 102, 104, 106, 108 at event 200. Wager processor 122 may also receive event information 132 relating to a status of event 200. Wager processor 122 may select or determine one or more wagers 134, 136 including terms from a wager database 124 based on event information 132, crowd information 130, and instructions 128 in a memory 126. Wager processor 122 may cause terms of wagers 134, 136 to be communicated to participants. For example, terms of wager 134 may be displayed on a billboard 118 and terms of wager 136 may be displayed on one or more mobile devices 110, 112, and/or 114. Participants may submit responses to the wager terms using mobile devices 110, 112 and/or 114.

Figure 2:
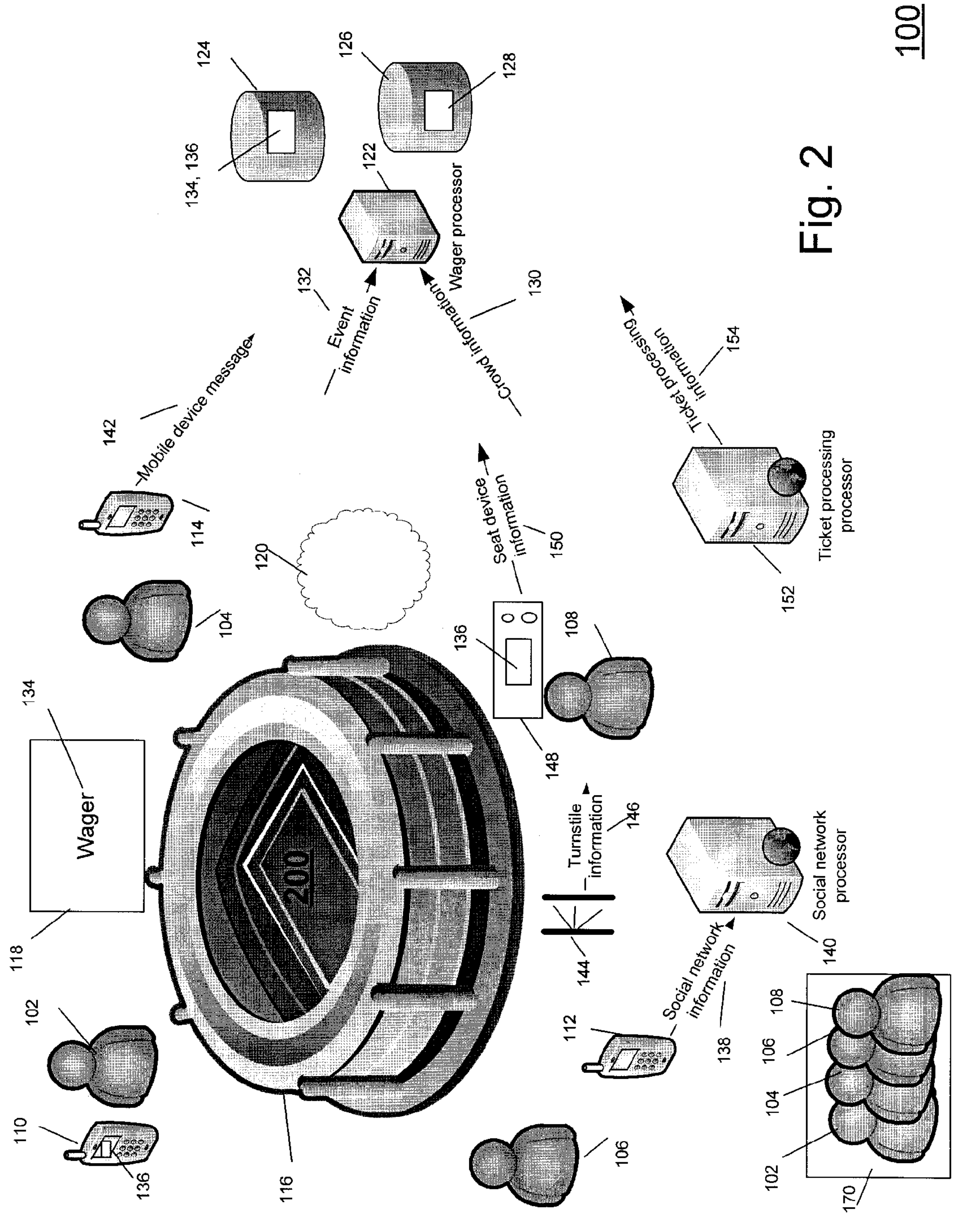
FIG. 2 illustrates some example systems that can be utilized to implement selecting a wager for an event.

FIG. 2 illustrates some example systems that can be utilized to implement selecting a wager for an event in accordance with at least some embodiments described herein. Those components in FIG. 2 that are labeled identically to components of FIG. 1 will not be described again for the purposes of clarity.

Billboard 118 may be configured in communication with wager processor 122 through a network 120. Similarly, wager processor 122 may receive event information 132 and/or crowd information 130 through network 120. Crowd information 130 may be generated from a variety of sources. For example, a participant 106 may generate social network information 138 indicating that the participant is attending, or plans to attend, event 200. Social network information 138 may include a post on a social network site, a "check-in" through a social network application etc. For example social network information 138 may indicate that participant 106 is checking in to event 200 at location 116. Wager processor 122 may receive social network information 138 from a social network processor 140. For example, wager processor 122 may be configured to crawl a site or sites controlled by social network processor 140. Participants may opt in and allow wager processor 122 to receive information from social network processor 140. Social network processor 140 may sell social network information 138 to wager processor 122. Social network information 138 may include information relating to participant 106. For example, social network information 138 may identify demographics of participant 106, interests of participant 106, etc. Demographics may include, for example, age, gender, income level, sexual orientation, job status, residence, occupation nationality, whether they own or rent or live with their parents, person assets, etc.

Wager processor 122 may be configured to determine mobile devices that are present at location 116. For example, even if a participant indicates in social network information 138 that he or she plans to attend the event, the participant may not actually attend the event. Similarly, participants may show up to event 200 without providing social network information 138. Wager processor 122 may determine mobile devices present at location 116 such as by receiving one or more mobile device messages 142 indicating that the mobile devices are present at location 116. Mobile device message 142 may further include information about participant 104 such as demographics, interests, etc. As mobile device message 142 is generated by mobile devices at location 116, mobile device message 142 may change over the course of the event. Mobile device message 142 may thus indicate whether participants stayed at location 116 for the entire event, came late to the event, left early before event 200 ended, etc. Wager processor 122 may also identify mobile devices at location 116 through social network information 138. For example, participants may post photographs or other social network information 138 including geography coordinates relating to location 116.

Participants may purchase tickets for event 200 from a ticket processing processor 152. During the purchase, participants may provide information relating to the participants such as demographics and/or interests of the participants. Wager processor 122 may receive ticket processing information 154 including information provided by participants when the participants purchase tickets to event 200. Ticket processing processor 152 may be run by a host running event 200 or could be run by a third party ticket processing service.

A seat device 148 may be disposed in or near seats of participants. Participants may enter information in seat device 148 relating to demographics or interest of participants. Seat device 148 may generate seat device information 150 and send seat device information to wager processor 122. Seat device 148 may further include a credit card reader, mobile wallet device, or other device effective to receive money from a participant. Wagers may be communicated to and/or displayed on seat device 148. Money may be received by seat device 148 and a response to wager details 136 may be generated by seat device 148. Seat device 148 may include a monitor and user interface effective to allow a participant to log into a social network and/or post information relating to participant 108. Participant 108 may post information relating to demographics and/or interests to a social network through seat device 148.

A turnstile 144 may receive information relating to demographics of participants when participants come to, or purchase tickets at, location 116. Turnstile 144 may produce turnstile information 146 that may be received by wager processor 122.

Crowd information 130 may include social network information 138, mobile device message 142, seat device information 150, turnstile information 146, and/or ticket processing information 154. Some of the information received by wager processor 122 may be sold to wager processor 122. Crowd information 130 may thus relate to demographics and/or interests of participants at event 200.

Wager processor 122 may process crowd information 130 to select or determine a wager 134, 136 in database 124. For example, wager processor 122 may use instructions 128 to process crowd information 130. In processing crowd information 130, wager processor 122 may prioritize and/or weigh turnstile information 146, seat device information 150 and/or ticket processing information 154 higher than other information. The weighing may be because this information may have a better chance of reflecting the crowd at location 116. Information relating to whether participants plan to attend event 200 in social network information 138 may be less reliable than information relating to participants at location 116.

Over the course of event 200, wager processor 122 may process crowd information 130 differently. For example, prior to event 200 and during an early part of event 200, ticket processing information 154, turnstile information and social network information 138 may be weighed heavier as this information may reflect whether participants intend to come to event 200. Once event 200 starts, mobile device messages 142 and seat device information 150 may be weighed heavier as this information may reflect participants actually at event 200 instead of participants who intended to attend event 200. Wager processor 110 may weigh information from greater numbers of participants who share their information. For example, if only 5 mobile devices provide mobile device messages 142, such information may be less reliable than other sources of information and may be weighed less when wager processor 122 processes crowd information 130.

Crowd information 130 may assist wager processor 122 in selecting or determining wagers tailored to crowd 170. Crowd information 130 may also reflect how a crowd responds to a particular wager and this information relating to responses to wagers may be used to select subsequent wagers. For example, crowd information 130 may indicate whether crowd 170 responded to a particular wager and subsequent wagers may be selected or determined in response to crowd 170 responding to prior wagers. Crowd information 130 may indicate that demographics of crowd 170 suggest more aggressive wagering tendencies such as a relatively younger male crowd. Wagers may be selected or determined that may be more interesting based on the demographics of crowd 170.

Figure 3:
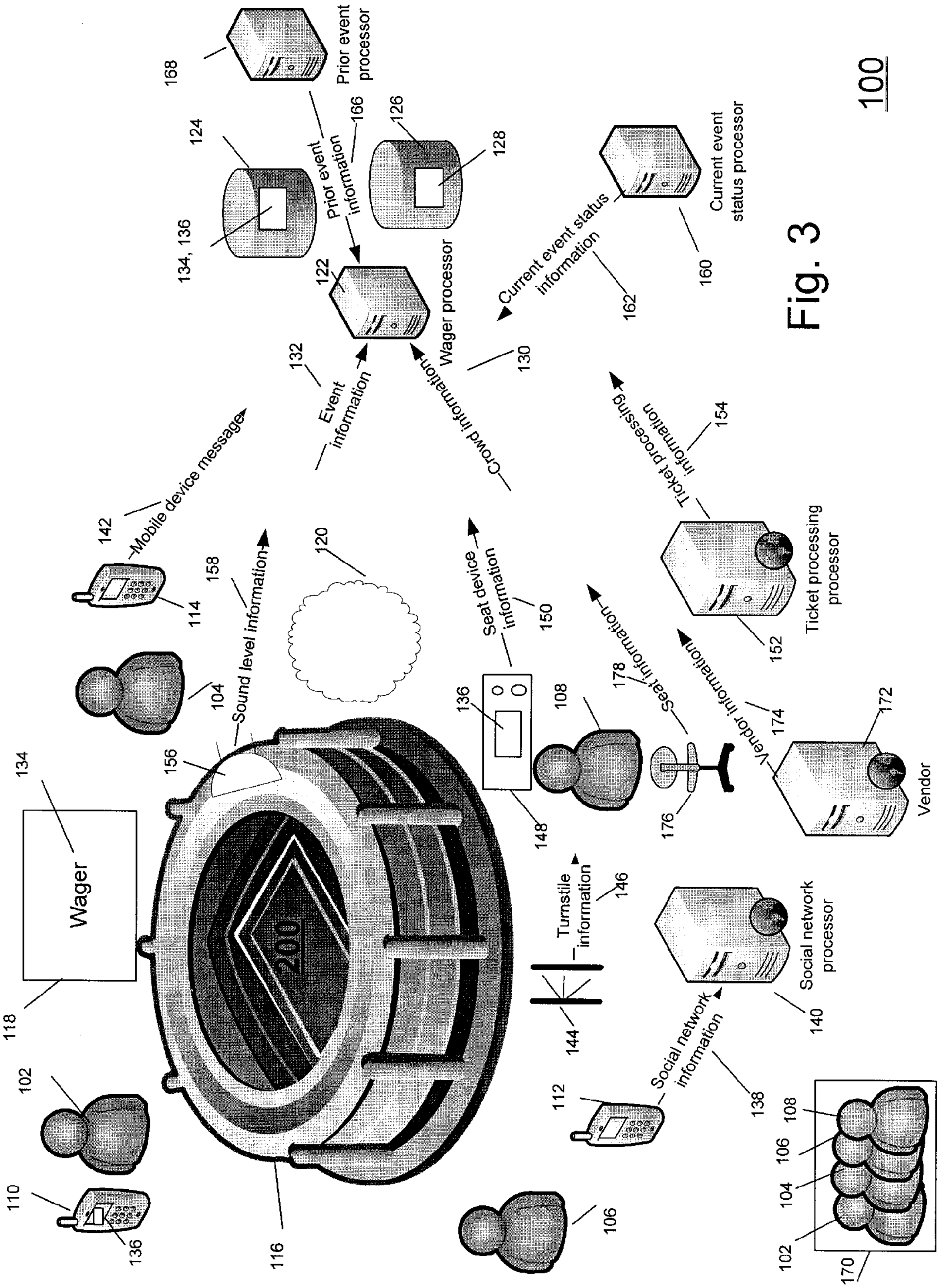
FIG. 3 illustrates some example systems that can be utilized to implement selecting a wager for an event.

FIG. 3 illustrates some example systems that can be utilized to implement selecting a wager for an event in accordance with at least some embodiments described herein. Those components in FIG. 3 that are labeled identically to components of FIGS. 1 and 2 will not be described again for the purposes of clarity.

Wager processor 122 may further receive and process event information 132. For example, a current event status processor 160 may obtain current event status information 162 relating to a current activity of event 200. For example, current event status information 162 may indicate whether a home or visiting team just scored, whether a football team has chosen to attempt a play on fourth down, etc. Depending on a status of an event, wager processor 122 may select a different, or no wager to be communicated and/or displayed. Current event status information 162 may vary depending on the nature of event 200. For example, different rules may be defined for current event status information 162 for different sports. Wager processor 122 may select a wager based on how much time will pass before the outcome of the wager is known. For example, if the outcome of the wager will be known very quickly, such as 10 seconds, less participants may bet and therefore wager processor 122 may avoid selecting that wager.

A prior event processor 168 may obtain prior event information 166 that is relevant to event 200. For example, prior event information 166 may indicate that certain players have suffered certain injuries, certain players are on a streak, about to break a record, etc. Prior event processor 168 may be configured to perform a natural language analysis of news stories available through network 120 based on players at event 200 to generate prior event information 166. Prior event processor 168 may search social network information 138 such as TWITTER feeds of players in event 200 to determine prior event information 166. Prior event information 166 may indicate that certain players have a history of injury or had been tackled hard in a prior event.

Wager processor 122 may receive other event information 132 relating to a status of event 200. For example, wager processor 122 may receive information relating to a sound level at event 200. A microphone 156 may receive a crowd sound level and generate sound level information 158. Event information 132 may include sound level information 158.

Wager processor 122 may also receive social network information 138 as part of event information 132. For example, participants may generate postings and/or alter an amount of social network chatter based on a status of event 200. For example, at a very intense moment during event 200, participants may post less chatter in social network information 138 than during slower more boring moments. Similarly, at an intense moment of an event, sound level information 158 may indicate that a sound level at location 116 has decreased. Instructions 128 may indicate that more intense moments may be more conducive to communicating wagers or that different wagers should be communicated depending on the interest level of the event.

Event information 132 may include seat information 178. Seat information 178 may be generated by devices in seats 176. For example, seat information 178 may indicate a number of participants sitting in their seats 176 and may be indicative of whether an exciting moment is currently occurring at event 200. Wager processor 122 may use seat information 178 to select and/or determine whether to communicate a wager.

Event information 132 may similarly include vendor information 174. Vendor information 174 may be generated by vendor processor 172 and may be indicative of whether participants are purchasing items such as food and/or drink from vendors at location 116. If participants are currently purchasing food and/or drink, such purchases may be indicative of a less exciting moment at event 200. Vendor information 174 may also indicate how much alcohol has been purchased by participants. Wager processor 122 may use vendor information 174 to select and/or determine whether to communicate a wager.

Among other possible benefits, using a system in accordance with the disclosure, wagers may be selected and communicated to participants at an event. A participant's experience at an event may be modified based on their social network information. Using event information and crowd information, a wager processor may select and cause wagers to be communicated. Wagers may be selected based on the mood of participants and displayed on the participant's mobile devices, or on a device at participant's seat. Wagers may be selected based on mood of the crowd at an event and displayed on a billboard. As information relating to the crowd may change over time, wagers selected and/or communicated may change to reflect the changing demographics and/or composition of the crowd. Wagers communicated to participants may be more specifically chosen for the participants as more granular information is available. An optimal set of granular wagers may be identified.

Crowd demographics may vary widely and the composition may not be known in advance. For example, a day game may have a different demographics than a night game. A game may have a large contingent of participants from another city for the visiting team. If many medical doctors are in a crowd, as may be detected based on the social network information, a wager may be more medically related—e.g. a wager may be selected betting on whether a player suffered a concussion or a torn ligament. The weather at the event may affect the crowd composition. An ad hoc social network may be created from participants at an event. A social network may be created based on information gathered during an event and the network may be broken after the event is over.

Events may include any location where two or more participants are present. For example, events may include concerts, school reunions, etc. Wagers could be selected based on what is going on at the event, and the mood of the crowd based on the crowd information. A wager could be, for example, a bet on how much time will pass before the next performer performs, what will be the next song played by a band, whether a joke by a comedian was good, etc. People in a car could use the disclosed system to wager on how much time will pass in the car before the next exit. People at a bus stop could wager on how much time will pass before the next bus comes. A number of the participants at the event, and the number of expected participants in a particular wager, may affect a size of a spread of a wager selected by a wager processor. If the number of expected participants in a particular wager is expected to be large, a small spread can be offered and the wager will be more attractive to participants Rather than generating many wagers throughout an event, a few selective wagers may be selected and thereby generate more revenue for an entity controlling wager processor. Wagers may be selected based on news stories written prior to the event.

Figure 4:
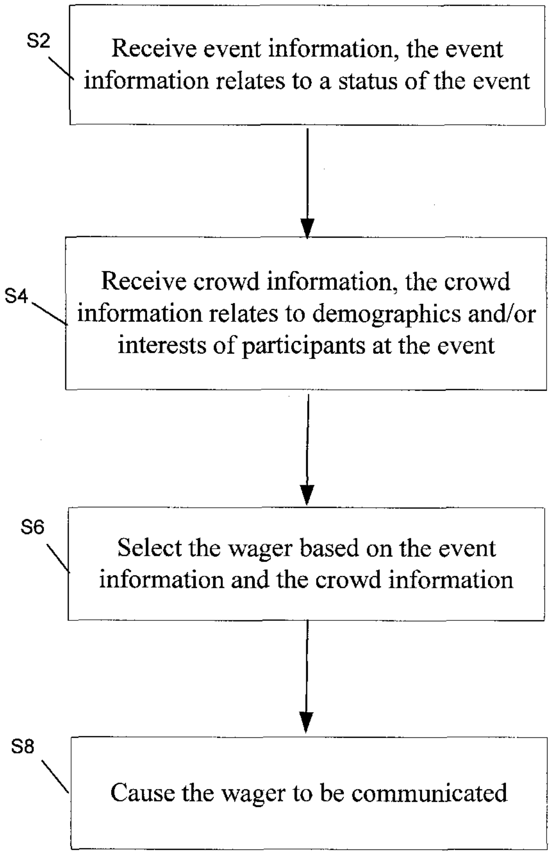
FIG. 4 depicts a flow diagram for example processes for implementing selecting a wager for an event.

FIG. 4 depicts a flow diagram for example processes for implementing selecting a wager at an event in accordance with at least some embodiments described herein. The process in FIG. 4 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Receive event information, the event information relates to a status of the event." At block S2, a wager processor may receive event information. The event information may relate to a status of the event such as current activity, a sound level, or social network information relating to the event.

Processing may continue from block S2 to block S4, "Receive crowd information, the crowd information relates to demographics and/or interests of participants at the event." At block S4, the wager processor may receive crowd information. The crowd information may relate to demographics and/or interests of participants at the event. The crowd information may include social network information such as whether a participant plans to attend or is attending the event. The crowd information may include geography coordinates of mobile devices at the location of the event. The crowd information may include ticket processing information or turnstile information based on purchase of tickets for the event. The crowd information may be received from a seat device.

Processing may continue from block S4 to block S6, "Select the wager based on the event information and the crowd information." At block S6, the wager processor may select a wager based on the event information and the crowd information. The wager may be selected based on participants indicated as being present at a location of the event at a particular time. The wager processor may select the wager based on information received relating to a prior displayed wager.

Processing may continue from block S6 to block S8, "Cause the wager to be communicated." At block S8, the wager processor may cause the wager to be communicated. For example, the wager processor may cause the wager to be communicated to or displayed on a mobile device or on a billboard at a location of the event.

Figure 5:
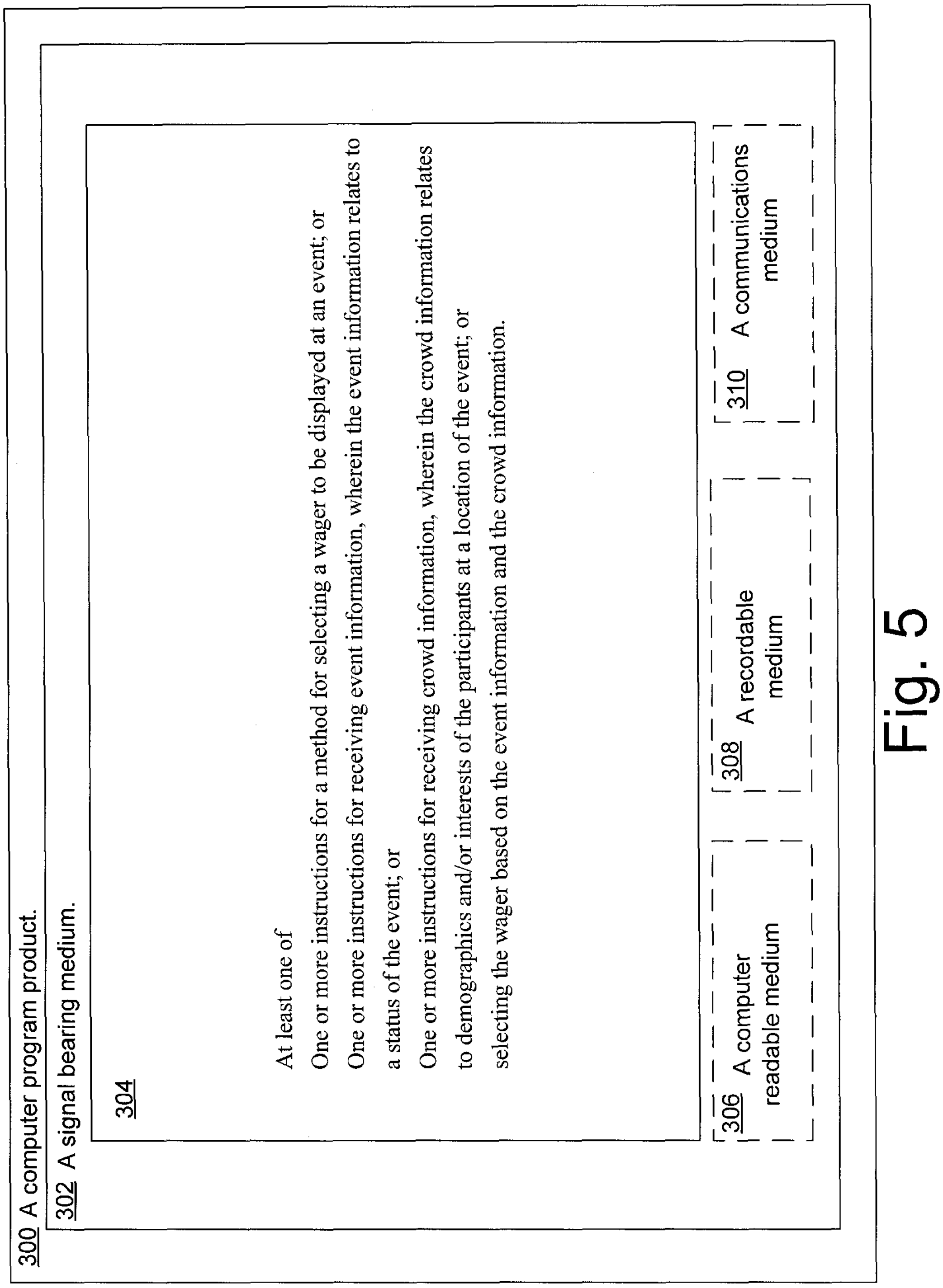
FIG. 5 illustrates computer program products for implementing selecting a wager for an event.

FIG. 5 illustrates computer program products 300 for implementing selecting a wager for an event in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, wager processor 122 may undertake one or more of the blocks shown in FIG. 5 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 6:
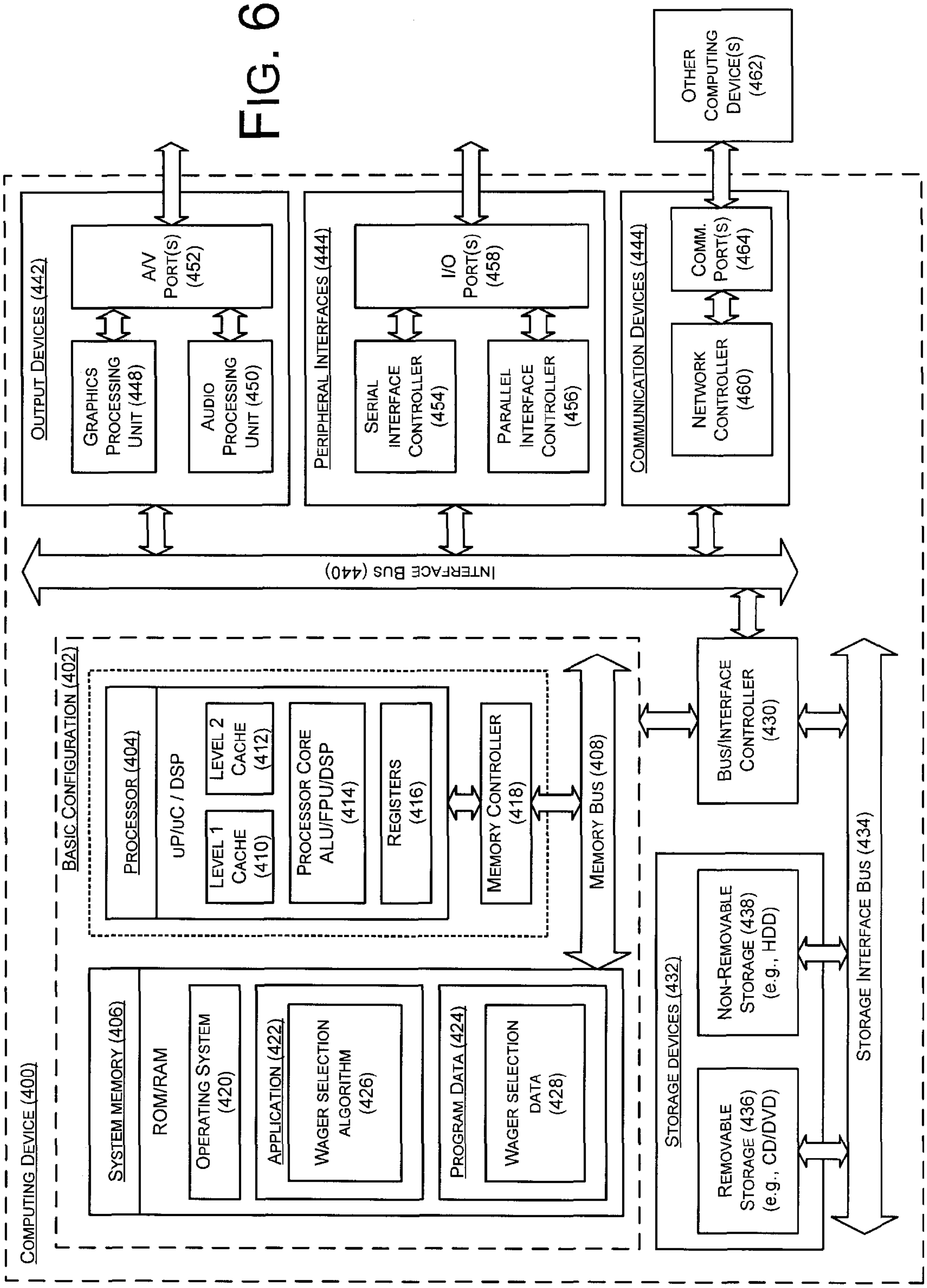
FIG. 6 is a block diagram illustrating an example computing device that is arranged to implement selecting a wager for an event.

FIG. 6 is a block diagram illustrating an example computing device 400 that is arranged to implement selecting a wager for an event in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a wager selection algorithm 426 that is arranged to perform the functions as described herein including those described previously with respect to FIGS. 1-5. Program data 424 may include wager selection data 428 that may be useful for implementing selecting a wager as is described herein. In some embodiments, application 422 may be arranged to operate with program data 424 on operating system 420 such that selecting a wager for an event may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for selecting a wager for an event, the method comprising, by a processor:

receiving event information, wherein the event information relates to a status of the event;

receiving crowd information, wherein the crowd information includes social network information, the social network information from a social network and including information that relates to demographics and/or interests of the participants at a location of the event and geography coordinates that relate to a location of the event, wherein the geography coordinates indicate that a particular mobile device and a particular participant are present at a location of the event;

selecting the wager based on the event information and the crowd information, wherein the wager includes terms; and sending the terms of the wager to at least one device at the location of the event.

2. The method of claim 1, further comprising causing terms of the wager to be displayed for viewing by at least one of the participants.

3. The method of claim 1, further comprising causing terms of the wager to be displayed for viewing by at least one of the participants on the mobile device.

4. The method of claim 1, wherein the social network information includes a check-in at a location of the event.

5. The method of claim 1, further comprising:

receiving a mobile device message, wherein the mobile device message indicates that the particular mobile device and the particular participant are present at the event; and wherein the crowd information includes the mobile device message.

6. The method of claim 1, wherein the crowd information includes ticket processing information or turnstile information, the ticket processing information or turnstile information being based on purchase of tickets for the event.

7. The method of claim 1, wherein the crowd information includes seat device information, wherein the seat device information is received from the particular participant at a particular seat at a location of the event.

8. The method of claim 1, wherein the event information includes vendor information, wherein the vendor information indicates whether participants are currently purchasing items at a location of the event; and selecting the wager is based on a number of participants currently purchasing items.

9. The method of claim 1, wherein:

the crowd information includes one or more of social network information, a mobile device message, seat device information, turnstile information and/or ticket processing information;

the social network information includes an indication that at least one of the participants plans to attend or is currently attending the event;

the social network information identifies the demographics and/or interests of at least one of the participants;

the mobile device message indicates that the particular mobile device and the particular participant are present at the event;

the seat device information is received from one of the participants at a seat in a location of the event;

the turnstile information is based on purchase of tickets for the event; and the ticket processing information is based on purchase of tickets for the event.

10. The method of claim 1, wherein:

the crowd information includes one or more of social network information, mobile device messages, seat device information, turnstile information and/or ticket processing information;

the social network information includes an indication that at least one of the participants plans to attend or is currently attending the event;

the social network information identifies the demographics and/or interests of at least one of the participants;

the mobile device message indicates that the particular mobile device and the particular participant are present at the event;

the seat device information is received from one of the participants at a seat in a location of the event;

the turnstile information is based on purchase of tickets for the event;

the ticket processing information is based on purchase of tickets for the event; and selecting the wager includes selecting a first wager by prioritizing the social network information and ticket processing information; and thereafter selecting a second wager by prioritizing the social network information, mobile device messages, seat device information, and turnstile information.

11. The method of claim 1, wherein the event information relates to a current activity of the event.

12. The method of claim 1, wherein the event information relates to a sound level at the event.

13. The method of claim 1, further comprising selecting the wager based on an amount of time before the outcome of the wager is known.

14. A device effective to select a wager for an event, the device comprising:

a memory including instructions; and a processor in communication with the memory, the processor effective to perform the instructions in the memory to:

receive event information, wherein the event information relates to a status of the event;

receive crowd information, wherein the crowd information includes social network information, the social network information from a social network and including information that relates to demographics and/or interests of the participants at a location of the event and geography coordinates that relate to a location of the event, wherein the geography coordinates indicate that a particular mobile device and a particular participant are present at a location of the event;

select the wager based on the event information and the crowd information wherein the wager includes terms; and send the terms of the wager to at least one device at the location of the event.

15. The device of claim 14, wherein the processor is further effective to cause terms of the wager to be displayed for viewing by at least one of the participants.

16. The device of claim 14, wherein the processor is further effective to cause the wager to be displayed for viewing by at least one of the participants on a billboard at a location of the event.

17. A system effective to select a wager for an event, the system comprising:

a wager database;

a memory including instructions;

an event status processor; and a wager processor configured to be in communication with the wager database, the memory and the event status processor over a network, the wager processor effective to perform the instructions in the memory to:

receive event information, wherein the event information relates to a status of the event;

receive crowd information, wherein the crowd information includes social network information, the social network information from a social network and including information that relates to demographics and/or interests of the participants at a location of the event and geography coordinates that relate to a location of the event, wherein the geography coordinates indicate that a particular mobile device and a particular participant are present at a location of the event;

select the wager based on the event information and the crowd information wherein the wager includes terms; and send the terms of the wager to at least one device at the location of the event.

18. The system of claim 17, wherein the processor is further effective to cause the wager to be displayed for viewing by at least one of the participants.

19. A mobile device comprising:

a screen;

a memory including instructions;

a processor configured to be in communication with the memory and the screen, the processor effective to:

send a mobile device message to a wager processor, wherein the mobile device message indicates whether a particular participant is at a location of the event;

receive terms relating to a wager in response to the mobile device message, the wager being based on a status of the event and social network information from a social network that includes information relating to demographics and/or interests of participants at a location of the event and geography coordinates that relate to a location of the event, wherein the geography coordinates indicate that a particular mobile device and a particular participant are present at a location of the event; and display the terms of the wager on the screen.

20. The mobile device of claim 19, wherein the processor is further effective to send the mobile device message to the wager processor, wherein the mobile device message includes social network information relating to demographics and/or interests of the particular participant at the event.

* * * * *